United States Patent [19]

Baker

[11] Patent Number: 4,635,672

[45] Date of Patent: Jan. 13, 1987

[54] AIR VENT

[75] Inventor: Sol Baker, Indianapolis, Ind.

[73] Assignee: ITT Corporation, New York, N.Y.

[21] Appl. No.: 768,453

[22] Filed: Aug. 22, 1985

[51] Int. Cl.⁴ .................. F16K 31/18; F16K 33/00
[52] U.S. Cl. .................... 137/202; 137/430;
137/449; 137/468; 236/53
[58] Field of Search ............. 137/185, 197, 199, 202,
137/430, 433, 445, 448, 449, 468; 236/52, 53

[56] References Cited

U.S. PATENT DOCUMENTS

| | | | |
|---|---|---|---|
| 1,856,451 | 5/1932 | Armstrong | 137/185 |
| 1,979,305 | 11/1934 | Armstrong | 137/185 |
| 2,232,583 | 2/1941 | Zies | 236/53 |
| 2,247,930 | 7/1941 | Turner | 137/202 |
| 2,251,086 | 7/1941 | Van Dyke et al. | 137/202 |
| 3,002,522 | 10/1961 | Klinefelter | 137/433 |
| 3,283,774 | 11/1966 | Johnson et al. | 137/185 |
| 3,306,314 | 2/1967 | Judsen | 137/202 |
| 3,489,348 | 1/1970 | Fujiwara | 236/53 |
| 3,586,032 | 6/1971 | Weinstein | 137/202 |
| 3,892,256 | 7/1975 | Schlesch | 137/185 |

FOREIGN PATENT DOCUMENTS 22065 4/1935 Australia ..................... 137/185

Primary Examiner—George L. Walton
Attorney, Agent, or Firm—Donald J. Lenkszus

[57] ABSTRACT

There is disclosed a vent for venting air from a system of the type which conducts fluid under pressure. The vent includes a chamber, a ball valve within a top wall of the chamber, and a float within the chamber which is arranged for vertical movement therein. A lever which carries a valve ball element is arranged for pivotal movement against the inner surface of the chamber top wall for disengaging the ball element from the valve when the valve is opened. When the valve is opened, the lever and ball element fall away from the valve. When the vent closes, the float acts upon the lever for guiding the ball element into seating relation with the vent valve.

13 Claims, 2 Drawing Figures

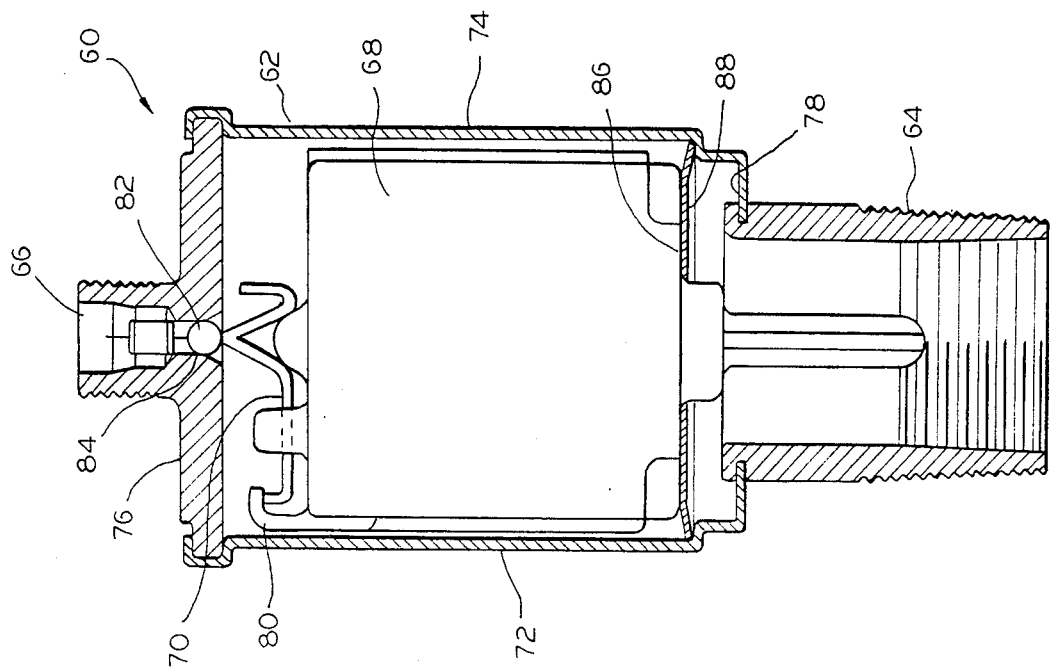
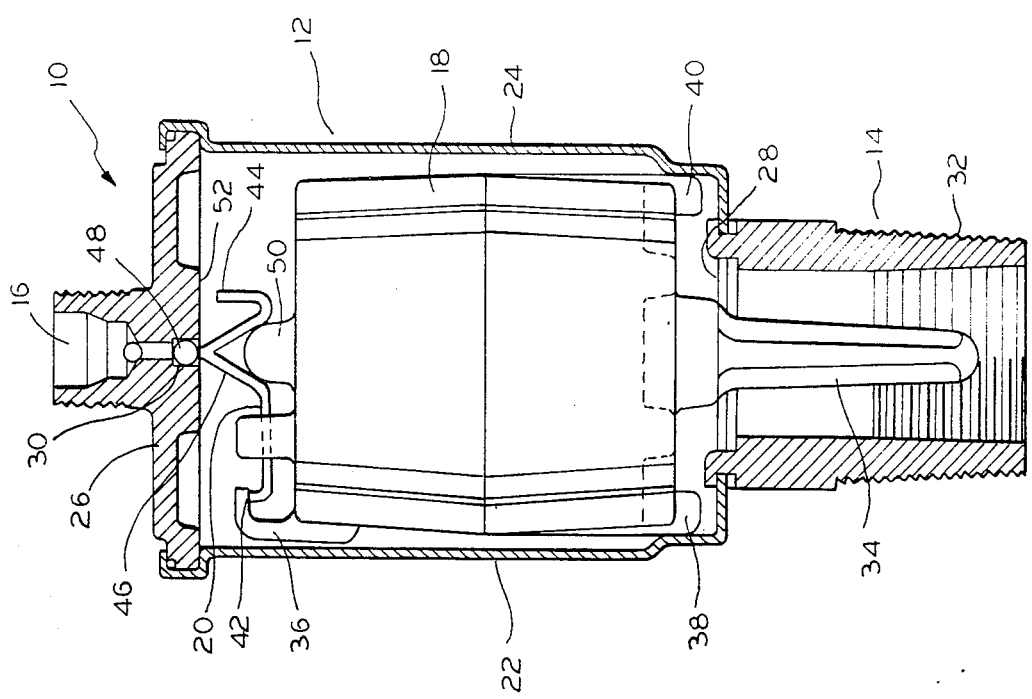
FIG. 1
FIG. 2

AIR VENT

The present invention generally relates to a vent and more particularly to an air vent for venting air from a system of the type which conducts fluid under pressure.

Air vents utilized in systems where fluid, such as steam or heated water, is conducted throughout the system in components such as pipes, radiators, etc. function to permit air to leave the system as the components in the system fill with the fluid. Thereafter, the fluid can flow through the system at rated capacity to maximize the effectivity of the system heat transfer equipment.

Vents of the above mentioned variety generally include a chamber having an orifice through which the air is vented. A closure device opens and closes the orifice responsive to the fluid level in the systems which conduct water or responsive to the fluid level and/or temperature in systems which conduct steam.

Vents utilized for the above stated purpose must be highly reliable. Such reliability is required to assure proper operation of the overall system and to more specifically maximize the efficiency of the system. Maximum efficiency is particularly important in view of the ever increasing cost of energy.

Hence, such vents must be arranged to positively open and close when appropriate. When opened, the vent components must be displaced from the orifice to assure maximum air flow out of the system to minimize the time in which the vents are opened. In addition, such vents must be dependable and have long useful lifetimes. As a result, the number of moving parts in such vents must be minimized along with potential wear points.

SUMMARY OF THE INVENTION

The invention provides a vent for venting air from a system of the type which conducts fluid under pressure. The vent includes a chamber having sidewalls, a top wall, and an input port arranged to be in fluid communication with the system, a valve within the chamber top wall, and a float within the chamber. The float is arranged for vertical movement within the chamber responsive to the level of the fluid within the chamber and level means are coupled to the float for opening and closing the valve responsive to the vertical position of the float within the chamber. The lever is arranged to pivot about a point on the inner chamber surface of the top wall as the valve is opened and to be disengaged from the top wall after the valve is opened.

BRIEF DESCRIPTION OF THE DRAWINGS

FIG. 1 is a side view, partly in cross-section, of an air vent embodying the present invention adapted for use in a water system; and FIG. 2 is a side view, partly in cross-section, of another air vent embodying the present invention, adapted for use in a steam system.

DETAILED DESCRIPTION

Referring now to FIG. 1, it illustrates an air vent 10 embodying the present invention which is particularly adapted for use in a system which conducts water. The vent 10 generally includes a chamber 12, an input port 14, an output port 16, a float 18, and a lever 20.

The chamber 12 includes sidewalls 22 and 24, a top wall 2, and a bottom wall 28. Within the top wall 26 is disposed a ball valve 30 which when opened, communicates the interior of chamber 12 with the output port 16. Adjacent to the bottom wall 28 is the input port 14 which includes a plurality of threads 32 to enable the vent 10 to be threadingly received within the system in which the vent is to be utilized. The input port 14 includes a central extension 34 which makes fluid communication with the interior of the chamber 12 to admit into the chamber the air to be vented and water from the system.

The float 18 is arranged for vertical movement within the chamber 12. The float 18 includes a hook portion 36 and a pair of downward extending tabs 38 and 40 which comprise stop means for limiting the downward vertical movement of the float 18 within the chamber 12.

The lever 20 has two ends 42 and 44. The end 42 is bent upwardly and engages the hook 36 carried by the float 18. Intermediate the ends 42 and 44 of the lever 20 is an inverted-v portion 46. Secured to the apex of the inverted-v portion 46 is a ball element 48 of ball valve 30. As will be explained subsequently, the ball element 48 is arranged to be seated within the ball valve 30 when the vent is closed and is displaced from the valve 30 when the valve is opened by pivotal movement of the lever 20.

The float 18 further includes a projection 50 which projects upwardly from the body of the float and engages the adjacent inner walls of the inverted-v portion 46 of the lever 20. The projection 50 provides a guide means for aligning the ball element 48 with the valve 30.

In order to provide proper buoyancy and weight to the float 18, the float 18 can be filled with a fluid. The fluid can be a volatile fluid such as a mixture of water and alcohol. This assures that the float 18 will be buoyant within the water and yet provide a proper amount of weight for operating the vent.

In operation, as air fills the interior of the chamber 12, the level of the water within the chamber drops. The float hook 36 then engages the end 42 of the lever 20. As the water level within the chamber continues to drop, the full weight of the float 18 is brought to bear on the end 42 of the lever 20. When this occurs, the ball element 48 which is held in a closed position within the valve 30 by virtue of the pressure differential between the interior of the chamber 12 and the external pressure begins to rotate within its valve seat until the end 44 of the lever 20 makes contact with the interior surface of the top wall 26 at a point generally indicated at 52. The weight of the float 18 then causes the lever 20 to pivot about the point 52 to displace the ball element 48 from the valve 30. This allows air to escape from the interior of chamber 12 through the valve 30 and the output port 16. After the ball element 48 disengages from the valve 30, the lever 20 and ball 48 will drop away from the valve and remain in contact with the float 18.

As the air is vented from the interior of the chamber 12, the water level within the chamber increases. When the float becomes buoyant, the float will move upwardly so that the projection 50 guides the ball element 48 back into seating arrangement with the valve 30. This completes the operation of the vent.

As can be seen from the foregoing, when the vent 10 is opened, the component parts therein namely the float 18, lever 20, and ball 48 drop away from the valve 30 to permit the unrestricted flow of the air from the chamber 12. Also, because the lever 20 pivots about the point 52 on the inner surface of the top wall 26, but drops away therefrom, a fixed hinge or pivot is negated which could wear in use and limit the useful lifetime of the vent 10.

In addition, the vent 10 is arranged to be positively opened and closed by virtue of the operation of the lever 20 and the returning of the ball element 48 to its proper seating position by virtue of the projection 50 on the float 18.

Referring now to FIG. 2, it illustrates another vent 60 embodying the present invention. The vent 60 is particularly adapted for use in a steam system wherein the opening and closing of the vent is responsive to both the fluid level and/or the fluid temperature.

Like the vent 10 of FIG. 1, the vent 60 generally includes a chamber 62, an input port 64, an output port 66, a float 68, and a lever 70. The chamber 62 includes sidewalls 72 and 74, a top wall 76, and a bottom wall 78.

The float 68 arranged for vertical movement within the chamber 62. The float 68 also includes a hook portion 80 which engages an end of the lever 70. Like the vent 10 of FIG. 1, the lever 70 has secured thereto a ball element 82 which is arranged to seat within a valve 84 contained within the top wall 76.

The float 68 also includes a bottom wall 86. Disposed beneath the bottom wall 86 is a thermic element 88 which extends from the chamber sidewalls 72 and 74 to beneath the float bottom wall 86. The thermic element 88 serves to limit the downward movement of the float 68 and is also arranged for forcing the float upward and closing the valve when the steam within the chamber reaches a predetermined temperature.

The basic operation of the vent 60 is substantially identical to the operation of the vent 10 of FIG. 1. When the steam within the chamber is below a predetermined temperature, the thermic element 88 which may be a bi-metal element is deformed downwardly to permit limited vertical movement of the float 68 within the chamber 62. Under these conditions, the float 68 is allowed to move vertically within the chamber under the influence of the bouyant force of condensate in the chamber. When the steam within the chamber 62 reaches a predetermined temperature, for example, 200° F., the thermic element 88 will be deformed upwardly. This cause the float 68 to move upwardly and to force the ball element 82 into engagement with the valve 84 as shown for closing the vent.

From the foregoing, it can be seen that the present invention provides a new and improved air vent for use in a system which conducts a fluid under pressure. More particularly, the invention provides a new and improved air vent for use in a water system or a steam system. The vent of the present invention provides for the unrestricted flow of air out of the vent when the vent is opened to assure that the vent is open for the shortest possible period of time. This is provided by the component parts of the vent falling away from the vent valve when the vent is opened. The vent of the present invention also eliminates wear points which would otherwise be required by fixed hinges or pivots for operating the lever assemblies therein. Lastly, the present invention provides a vent which positively opens and closes to assure reliable and dependable operation.

What is claimed is:

1. A vent for venting air from a system of the type which conducts fluid under pressure, said vent comprising:
    a chamber having sidewalls, a top wall, and an input port arranged to be in fluid communication with said system;
    a valve within said chamber top wall, said valve including a ball element;
    a float within said chamber, said float being arranged for vertical movement within said chamber responsive to the level of said fluid within said chamber; and
    lever means coupled to said float for opening and closing said valve responsive to the vertical position of said float within said chamber, said lever being arranged to pivot about a point on the inner chamber surface of said top wall as said valve is opened and to be disengaged from said top wall after said valve is opened;
    said lever further including an inverted-v portion having an apex, said ball element being secured to said lever at said apex; and
    said float further including guide means comprising a projection from said float, said projection being in contact with the adjacent inner walls of said inverted-v portion of said lever for guiding said ball element into seating position within said valve.

2. A vent as defined in claim 1 wherein said lever has two ends and wherein one said end is arranged to contact said inner chamber surface of said top wall as said lever pivots.

3. A vent as defined in claim 2 wherein the other said end of said lever is coupled to said float.

4. A vent as defined in claim 3 wherein said ball element is secured to said lever at a point intermediate said ends.

5. A vent as defined in claim 3 wherein said float includes hook means for being coupled to said other said end of said lever.

6. A vent as defined in claim 1 wherein said float further includes stop means for limiting the downward vertical movement of said float within said chamber.

7. A vent as defined in claim 6 wherein said stop means include a pair of downward extending tabs disposed on opposite sides of said float.

8. A vent as defined in claim 1 wherein said float includes a bottom wall and wherein said vent further includes a thermic element for limiting the downward vertical movement of said float within said chamber and for contacting said float bottom wall for forcing said float upward and closing said valve when the fluid within said chamber reaches a predetermined temperature.

9. A vent as defined in claim 8 wherein said thermic element comprises a bi-metal element.

10. A vent as defined in claim 9 wherein said bi-metal element extends from said chamber sidewalls beneath said float bottom wall.

11. A vent as defined in claim 1 wherein said float is at least partially filled with a liquid.

12. A vent as defined in claim 11 wherein said liquid is a volatile liquid.

13. A vent as defined in claim 12 wherein said volatile liquid includes water and alcohol.

* * * * *